(12) United States Patent
Moulis et al.

(10) Patent No.: US 6,681,789 B1
(45) Date of Patent: Jan. 27, 2004

(54) FUEL TANK VENTILATION SYSTEM AND METHOD FOR SUBSTANTIALLY PREVENTING FUEL VAPOR EMISSIONS

(75) Inventors: Charles E. Moulis, Ypsilanti, MI (US); Leon S. Jones, Ypsilanti, MI (US)

(73) Assignee: The United States of America as represented by the United States Environmental Protection Agency, Washington, DC (US)

( * ) Notice: Subject to any disclaimer, the term of this patent is extended or adjusted under 35 U.S.C. 154(b) by 13 days.

(21) Appl. No.: 10/112,634

(22) Filed: Mar. 28, 2002

Related U.S. Application Data

(60) Provisional application No. 60/279,442, filed on Mar. 29, 2001.

(51) Int. Cl.[7] .............................. F17D 1/18; F16K 1/18
(52) U.S. Cl. ..................... 137/14; 220/88.3; 220/567.2; 220/723; 137/587
(58) Field of Search ................. 220/88.1, 88.3, 220/567.2, 723; 137/14, 587

(56) References Cited

U.S. PATENT DOCUMENTS

| | | | | | |
|---|---|---|---|---|---|
| 1,690,072 | A | * | 10/1928 | Johnson | 220/721 |
| 4,254,887 | A | * | 3/1981 | Bold | 220/723 |
| 5,979,481 | A | * | 11/1999 | Ayresman | 137/14 |
| 6,360,729 | B1 | * | 3/2002 | Ellsworth | 220/723 |
| 6,527,002 | B1 | * | 3/2003 | Szakaly | 137/14 |

FOREIGN PATENT DOCUMENTS

| WO | 99/47434 | * | 9/1999 | | 137/14 |
|---|---|---|---|---|---|

* cited by examiner

Primary Examiner—A. Michael Chambers
(74) Attorney, Agent, or Firm—Weiss, Moy & Harris, PC

(57) ABSTRACT

A fuel tank ventilation system and method are provided for substantially preventing fuel vapor emissions without significant increase in tank pressure. The system and method include a flexible bladder within the fuel tank that alternately deflates and inflates in response to a change in fuel vapor pressure and fuel volume.

12 Claims, 4 Drawing Sheets

FUEL TANK VENTILATION SYSTEM AND METHOD FOR SUBSTANTIALLY PREVENTING FUEL VAPOR EMISSIONS

CROSS-REFERENCE

This application claims the benefit of U.S. Provisional Application Ser. No. 60/279,442, filed Mar. 29, 2001.

FIELD OF THE INVENTION

This invention relates generally to a system and method for improving air quality and, more specifically to a system and method for substantially preventing fuel vapor emissions that are caused by fuel heating during diurnal temperature variations (commonly referred to as "diurnal emissions"), engine operation, and refueling.

BACKGROUND OF THE INVENTION

Air pollution negatively impacts the environment and the health of its inhabitants. One of the sources of air pollution are gases that escape from liquid fuels, particularly gasoline, and form a vapor in a process called vaporization or evaporation. These fuel vapors are collectively referred to as "evaporative emissions" and include diurnal emissions and other evaporative emissions as hereinafter described.

Diurnal emissions arise from the increase in the volatility of the fuel and expansion of the vapor in the fuel tank due to the diurnal rise in ambient temperature. Fuel volatility is usually expressed by the empirical fuel parameter known as Reid vapor pressure (RVP). These diurnal emissions will occur each day for all vehicles with fuel in the tank, even when stationary.

In an unsealed or open-vented fuel tank, the vapor space is at atmospheric pressure (typically about 14.7 psi), and contains a mixture of fuel vapor and air. At all temperatures below the fuel's boiling point, the vapor pressure of the fuel is less than atmospheric pressure. This is also called the partial pressure of the fuel vapor. The partial pressure of the air is equal to the difference between atmospheric pressure and the fuel vapor pressure. For example, in an open-vented tank at 60° F., the vapor pressure of a typical fuel would be about 4.5 psi. In this example, the partial pressure of the air would be about 10.2 psi . Assuming that the vapor mixture behaved as an ideal gas, then the mole fractions (or volumetric fractions) of fuel vapor and air would be equal to their respective partial pressures divided by the total pressure; thus, the fuel would be 31 percent of the mixture (4.5/14.7) and the air would be 69 percent of the mixture (10.2/14.7).

Diurnal emissions occur when the fuel temperature increases, increasing the equilibrium vapor pressure of the fuel. For example, assume that the fuel in the previous example was heated to 90° F., in which case the vapor pressure of that same typical fuel would be about 8.0 psi. To maintain the vapor space at atmospheric pressure, the partial pressure of the air would need to decrease to 6.7 psi, which means that the vapor mixture must expand in volume. This forces some of the fuel-air mixture (i.e. fuel vapor emissions) to be vented out of the tank. When the fuel later cools, the vapor pressure of the fuel decreases, contracting the mixture, and drawing fresh air in through the vent. When the fuel is heated again, another cycle of diurnal emissions occurs.

Evaporative emissions also occur through hot soak loss representing evaporation from the fuel delivery system when a hot engine is turned off and the vehicle is stationary. It arises from transfer of heat from the engine and hot exhaust to the fuel system where fuel is no longer flowing. Other evaporative emissions occur while the vehicle is in motion with the engine operating (commonly referred to as "running losses").

Previous attempts to prevent or reduce such emissions have not been entirely successful. For example, evaporative canister systems have been used in an attempt to control evaporative emissions from gasoline-fueled automobiles. The vented fuel vapors are collected in charcoal canisters and intermittently purged by flowing fresh air across the canister while the automobile engine is running and routing the air-fuel mixture to the engine where the fuel vapors are combusted. These systems are complicated and require substantial effort to design. They also require that the engines run frequently to purge the vapors; they do not work well for engines operated infrequently. Pressurized sealed fuel tanks have also been used to contain evaporative emissions, but their design is costly and they raise potential safety concerns. Collapsible fuel bladders have been used to change the volume of the tank in response to changes in fuel volume or vapor pressure, but they are costly and concerns have been raised about their durability. Open-vented fuel tanks have been used for most non-automotive gasoline engine applications. They do not contain evaporative emissions, although substantially prevent pressure build up within the tank.

Accordingly, there is a need for a fuel tank ventilation system and method that substantially prevents evaporative emissions from the fuel tank so as to improve air quality. There is also a need for a fuel tank ventilation system and method of simple construction such that their cost is not prohibitive. There is a still further need for a fuel tank ventilation system and method that are safe, durable, and may be used for engines operated infrequently. There is an additional need for a fuel tank ventilation system and method that substantially prevents emissions with lower pressures than previously achieved with a pressurized tank. The present invention fulfills these needs and provides other related advantages.

SUMMARY OF THE INVENTION

The fuel tank ventilation system comprises, generally, a fuel tank and a bladder within the fuel tank that vents to the atmosphere and inflates and deflates with a variable volume of air. The exchange of air between the atmosphere and the bladder substantially maintains the vapor space within the fuel tank at atmospheric pressure and only air from the bladder is vented from the fuel tank because the air within the bladder is isolated from the fuel vapor. The system may further comprise a pressure relief valve and a vacuum relief valve.

The tank may be a sealed fuel tank for receiving and containing liquid fuel including gasoline, methanol or the like. The bladder is preferably constructed of a lightweight flexible material with a low permeability and long-term stability to gasoline and gasoline vapor. The bladder may be sized according to the following equation:

$$\frac{V_B}{V} = 1 - \frac{(P_T - VP_{\max})}{(P_T - VP_{\min})}$$

Wherein:
  $VP_{min}$=vapor pressure of the liquid at the minimum temperature.
  $VP_{max}$=vapor pressure of the liquid at the maximum temperature.

$P_T$=Total pressure (i.e., ambient pressure).

V=total volume of the fuel tank (i.e., fuel capacity plus vapor headspace).

$V_B$=required bladder volume.

The bladder may include sealed pockets for containing air, or other floatation aids to substantially ensure that the bladder remains above the liquid fuel when the bladder is empty.

In an alternative embodiment, the fuel tank ventilation system may be used in combination with a conventional charcoal canister evaporative control system, with the bladder and pressure relief valve being vented through the canister, rather than to the atmosphere.

Other features and advantages of the present invention will become apparent from the following more detailed description, taken in conjunction with the accompanying drawings that illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
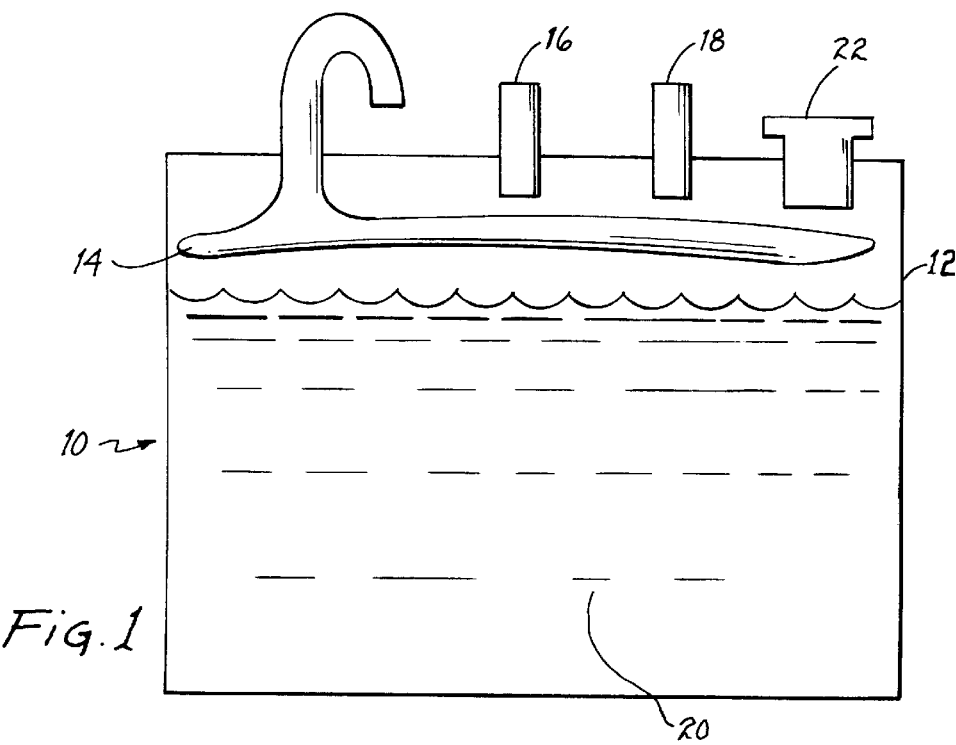
FIG. 1 is a cross-sectional operational view of a fuel tank ventilation system embodying the invention, illustrating a fuel tank substantially filled with a liquid fuel and containing a flexible bladder in a deflated condition in a fuel vapor space above the liquid fuel and vented to the atmosphere.

As shown in the drawings for purposes of illustration, the present invention is concerned with an improved fuel tank ventilation system and method for substantially preventing fuel tank vapor emissions, the system generally designated in the accompanying drawings by the reference number 10. As shown in FIG. 1–4, the system 10 comprises, generally, a fuel tank 12 and a bladder 14 within the fuel tank that vents to the atmosphere and inflates and deflates with a variable volume of air to substantially prevent fuel vapor emissions without a significant increase in tank pressure. The system may further comprise a pressure relief valve 16 and a vacuum relief valve 18 to relieve, respectively, excessive pressure and vacuum in the fuel tank.

In accordance with the present invention, and as illustrated with respect to a preferred embodiment in FIGS. 1 through 5, the system and method substantially prevent vapor, emissions from the fuel tank by isolating the vapor emissions from the air vented to the atmosphere.

The fuel tank 12 may be a sealed fuel tank for receiving and containing liquid fuel including gasoline, methanol or the like. The fuel tank 12 may be filled with liquid fuel 20 through an opening (not shown) in the fuel tank sealed with a removable fill cap 22. Although a fuel tank is herein described, it is to be understood that a sealed tank containing volatile organic liquids other than fuel is also included within the confines of this invention.

As shown in FIGS. 1–4, the bladder 14 vents to the atmosphere to allow the exchange of air into and out of the bladder 14. The bladder is preferably constructed of a durable substantially lightweight flexible material with a low permeability to gasoline vapor and that is stable long term in the presence of gasoline and gasoline vapors. One example would be a fluoroelastomer fabric made by Fairprene, Inc. (85 Mill Plain Road, Fairfield, Conn. 06430). Other widely available sheeting such as sheeting made from Viton® nitrile rubber may also be used. The preferred method of constructing the bladder is to mold it in a single piece to avoid seams that could fail in use. However, the bladder could also be constructed with adhesive seams, provided they remain durable in the presence of gasoline or other volatile organic liquids. The venting of the bladder may be from an opening in at least one of the seams or from a planar surface of the bladder. The bladder may be vented outside the sealed tank by a vent of unitary construction with the bladder as shown in FIGS. 1–4 or the bladder may be connected to a separate vent (not shown) that exits outside the sealed tank.

Sizing of the bladder affects the extent to which diurnal emissions are substantially prevented. To calculate the required bladder volume, maximum and minimum temperatures for the worst case design day are assumed, such as 72° F. to 96° F. Calculation is based on the following equation:

$$\frac{V_B}{V} = 1 - \frac{(P_T - VP_{\max})}{(P_T - VP_{\min})}$$

Wherein:

$VP_{min}$=vapor pressure of the liquid at the minimum temperature.

$VP_{max}$=vapor pressure of the liquid at the maximum temperature.

$P_T$=Total pressure (i.e., ambient pressure).

V=total volume of the fuel tank (i.e., fuel capacity plus vapor headspace).

$V_B$=required bladder volume.

All pressures are in the same units (e.g., psi) and all volumes are in the same units (e.g., gallons). The worst case for a given liquid is dependent on both the maximum temperature and the magnitude of the temperature change. If the worst case is not known, it would be necessary to calculate the required bladder volume for different days and to use the largest volume. Using the above equation for the example described above, where the fuel temperature varies from 60° F. to 90° F., the bladder would need to be 34 percent of the maximum vapor space volume (i.e., the total volume of the fuel tank) in order to substantially prevent diurnal emissions without allowing any significant increase in tank pressure.

Smaller bladder volumes could be used if pressure increase or vacuum increase within the tank is tolerable. The relationship between the smaller bladder volume and the magnitude of the pressure change is dependent on the pressures at which the pressure and vacuum relief valves open and the functional dependence of the vapor pressure of the liquid on temperature. To eliminate refueling emissions without a pressure change within the tank, the bladder volume may be substantially equal to the liquid fuel capacity of the tank.

The bladder 14 may include sealed pockets (not shown) for containing air, or other floatation aids to substantially ensure that the bladder remains above the liquid fuel 20 when the bladder is empty. This would prevent the bladder from being compressed by the hydrostatic pressure of the fuel. In addition to positioning the bladder above the fuel, the bladder 14 should be positioned within the fuel tank 12 such that it does not interfere with other fuel system components such as the fuel pick-up or catch on any sharp edges in the fuel tank.

As is known in the art, the fuel tank 12 may include the pressure relief valve 16 and the vacuum relief valve 18 to substantially prevent excessive pressure or vacuum from developing with the tank. The pressure relief valve opens if the tank pressure exceeds some value (e.g. two psi), and the vacuum relief valve opens if the tank vacuum exceeds some value (e.g.one psi). For example, if the tank was completely drained, and the volume of the bladder was not large enough to compensate for the entire volume of the fuel, then a vacuum would develop within the tank. If the vacuum became too large, the vacuum relief valve would open to equalize the pressure. Vacuum could also develop from a large decrease in temperature. At the other extreme, if the bladder 14 was deflated, and the liquid fuel 20 was heated, pressure in the fuel tank 12 would increase until the pressure relief valve 16 opened to equalize the pressure.

Figure 2:
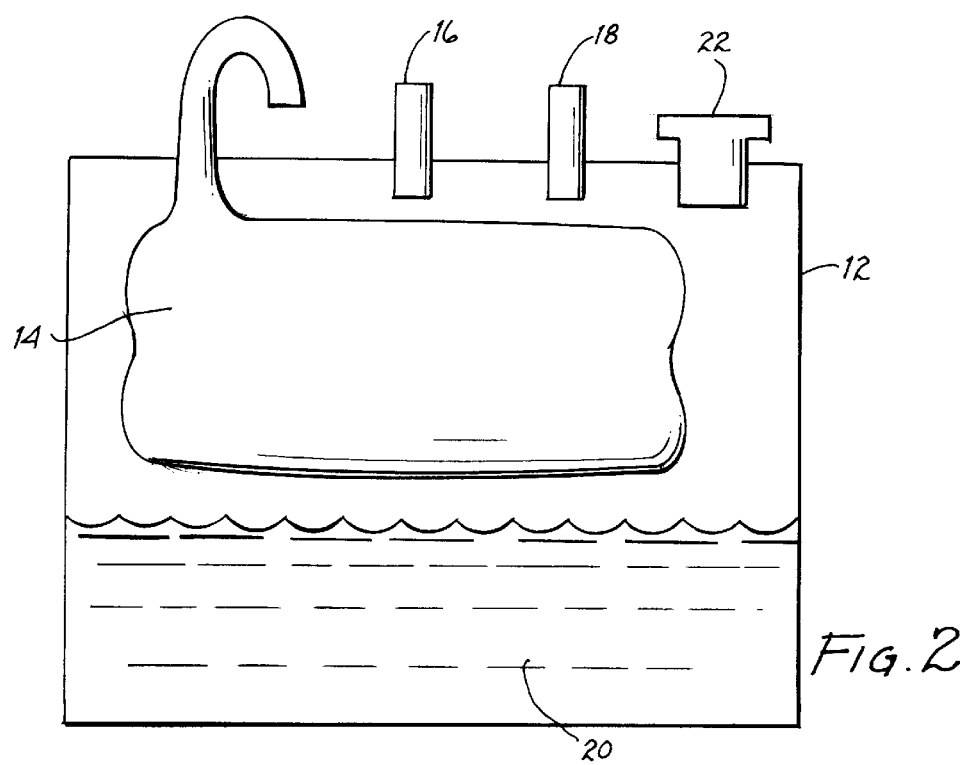
FIG. 2 is another cross-sectional operational view of the fuel tank ventilation system of FIG. 1, illustrating the flexible bladder in an inflated condition to replace the lost volume of liquid fuel in the fuel tank as a result of engine operation.
Figure 3:
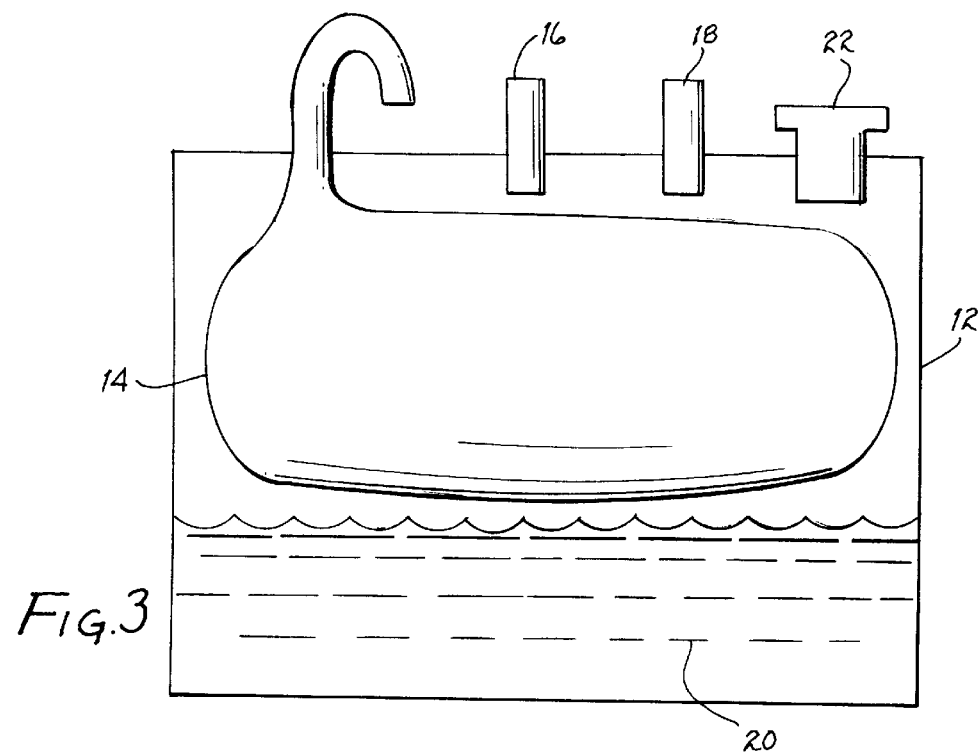
FIG. 3 is another cross-sectional operational view of the fuel tank ventilation system of FIGS. 1 and 2, illustrating the flexible bladder in a further inflated condition as the vapor pressure of the liquid fuel decreases as its temperature decreases without engine operation.
Figure 4:
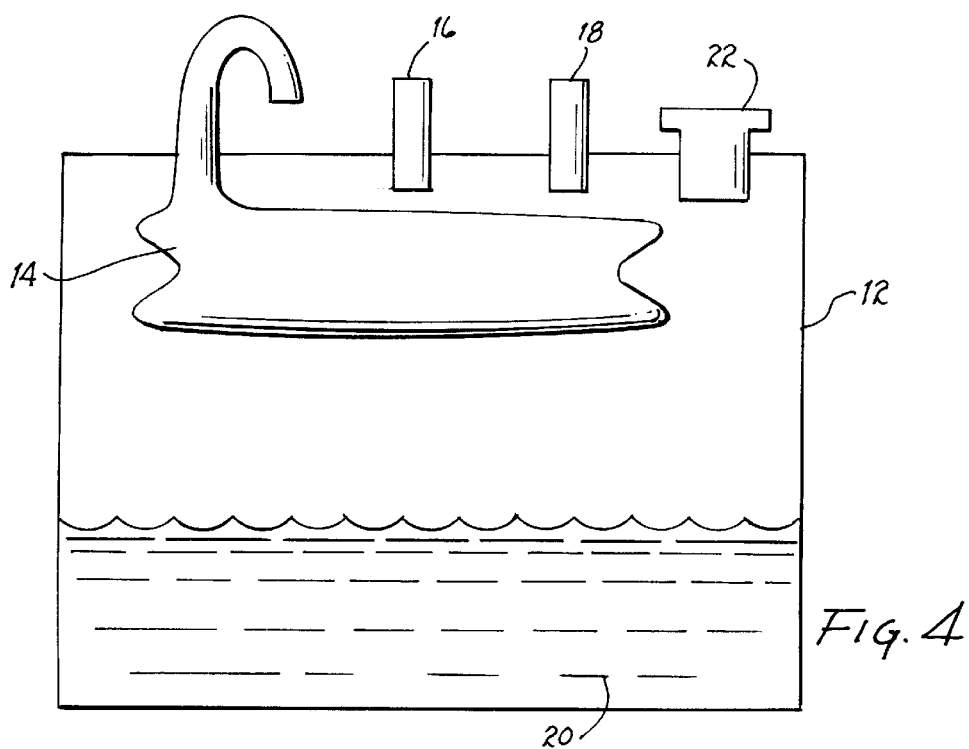
FIG. 4 is another cross-sectional operational view of the fuel tank ventilation system of FIGS. 1, 2 and 3, illustrating the flexible bladder in a deflated condition as the liquid fuel temperature increases causing increase of the fuel vapor pressure and a small positive pressure within the bladder forcing air from the bladder into the atmosphere as the vapor mixture expands in the fuel tank in volume.
Figure 5:
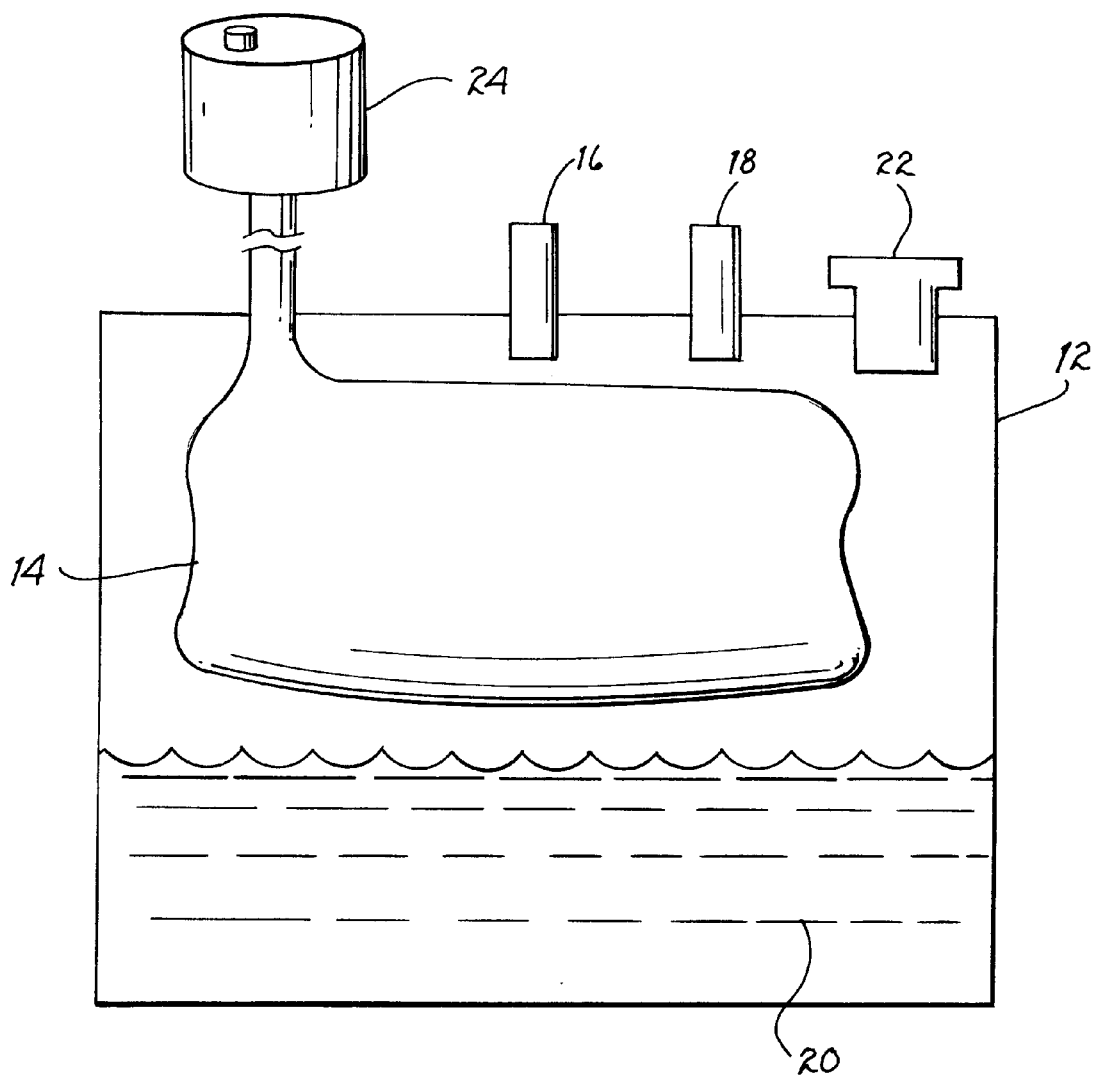
FIG. 5 is an alternative embodiment of the invention, illustrating in cross-section the fuel tank ventilation system of FIGS. 1–4 combined with a charcoal canister ventilation system.

The system and method are shown in operation in FIGS. 1–4. When the fuel tank 12 is full, the bladder 14 is empty (or nearly empty), leaving the full volume of the fuel tank available for fuel (FIG. 1). As fuel is used by the engine, and the liquid fuel volume decreases, the bladder begins to fill with air to replace the volume of the fuel (FIG. 2). (Note: the decrease in liquid fuel could be offset to some degree by increasing fuel vapor pressure caused by increasing fuel temperature.) This would continue while the engine was running. If the engine was shut off and the tank was left overnight, the vapor pressure of the fuel would drop as the temperature of the fuel dropped. This would cause a small negative pressure within the bladder that would cause it to fill with more air until the pressure equilibrated (FIG. 3). The next day, the vapor pressure of the fuel would increase as the temperature of the fuel increased. This would cause a small positive pressure within the air bladder that would force air out (FIG. 4). When the tank is refilled, a small positive pressure would develop within the tank, forcing the air out of the bladder to equalize the pressure (FIG. 1). It is believed that this exchange of air between the atmosphere and the bladder substantially maintains the vapor space at atmospheric pressure and only air from the bladder would be vented from the fuel tank because the air within the bladder is isolated from the fuel vapor, thus substantially preventing fuel vapor emissions. By contrast, in a tank design without the bladder, it would be a fuel vapor-air mixture that would be vented thus contributing as a source of air pollution.

When the liquid fuel 20 is heated, and the mixture of fuel vapors and air expands, the bladder 14 is deflated, which forces some air within the bladder to be vented to the atmosphere. If the fuel is cooled, and the mixture of fuel vapor and air contracts, fresh air is drawn into the bladder causing it to inflate.

The method of the invention comprises the steps of providing a tank containing volatile fuels; positioning a flexible bladder within the tank above the fuel; and venting the flexible bladder to the atmosphere.

It is important to note that this system and method also reduce refueling emissions to some degree. Refueling emissions occur when the fuel vapor-air mixture within the tank is forced out of the tank by the addition of the liquid fuel. Thus, refueling emissions would be reduced to the extent that the volume of fuel vapor-air mixture is replaced by the volume of the bladder. Refueling emissions may be substantially eliminated by a bladder that had a maximum volume equal to the total fuel tank volume. However, that is not likely to be practical. emissions by at least 34 percent in the example where the fuel temperature raised from 60° F. to 90° F. The reduction would be larger for refueling events that occurred with partially filled fuel tanks, since a partially filled fuel tank would have less vapor space than a completely empty fuel tank.

The bladder may also be used to minimize pressure in the tank. When used in this manner, the bladder compensates for changes in volume in the sealed fuel tank. The bladder fills up the vapor space in the fuel tank above the fuel. By minimizing the vapor space, less air is available to mix with the heated fuel and less fuel evaporates. As vapor is generated in the small vapor space, air is expelled from the bladder, which is vented to the atmosphere. Because the bladder deflates as vapor is generated, the volume of the vapor space grows and substantially no pressure is generated. Once the fuel tank cools as ambient temperature goes down, the resulting vacuum in the fuel tank inflates the bladder. Depending on the size of the bladder, pressure in the tank may be minimized permitting reduction of the pressure limit on the pressure relief valve.

Preliminary Test Results

A preliminary version of the invention was constructed using an off-the-shelf six-gallon portable marine fuel tank made of high density polyethylene (HDPE). It was tested in its as-received baseline configuration and in a modified configuration that incorporated the invention. In its baseline configuration, the tank included openings for a fuel inlet, a fuel siphon pickup, and a fuel level gauge. Each of the openings were removably sealed by a cap. The cap for the fuel inlet open is hereinafter referred to as a "filler cap." In both the baseline and modified cases, the tank was filled with 9 RVP gasoline to 50 percent of its capacity. The emissions were tested by placing the filled fuel tank within a sealed, temperature-controlled enclosure called a SHED (Sealed Housing for Determination). This equipment is specified in 40 CFR Part 86 to measure evaporative emission for gasoline-fueled highway vehicles. The fuel temperature was allowed to equilibrate to 72° F. within the SHED. When the fuel temperature reached 72° F., the SHED was ventilated. The SHED was then resealed, and the 24-hour diurnal temperature cycle was begun. The concentration of fuel vapors within the SHED was recorded as the temperature was cycled between 72° F. and 96° F., according to the schedule shown below.

| 24-hour Temperature Cycle for Emission Testing | |
|---|---|
| Time (hours) | T (° F.) |
| 0 | 72.0 |
| 1 | 72.5 |
| 2 | 74.5 |
| 3 | 79.8 |
| 4 | 85.1 |
| 5 | 89.2 |
| 6 | 93.2 |
| 7 | 94.6 |
| 8 | 95.9 |
| 9 | 96.1 |
| 10 | 95.5 |
| 11 | 93.9 |
| 12 | 92.3 |
| 13 | 89.2 |
| 14 | 86.0 |
| 15 | 83.4 |
| 16 | 80.8 |
| 17 | 78.9 |
| 18 | 77.0 |
| 19 | 75.8 |
| 20 | 74.7 |
| 21 | 73.9 |
| 22 | 73.0 |
| 23 | 72.5 |
| 24 | 72.0 |

Figure 6:
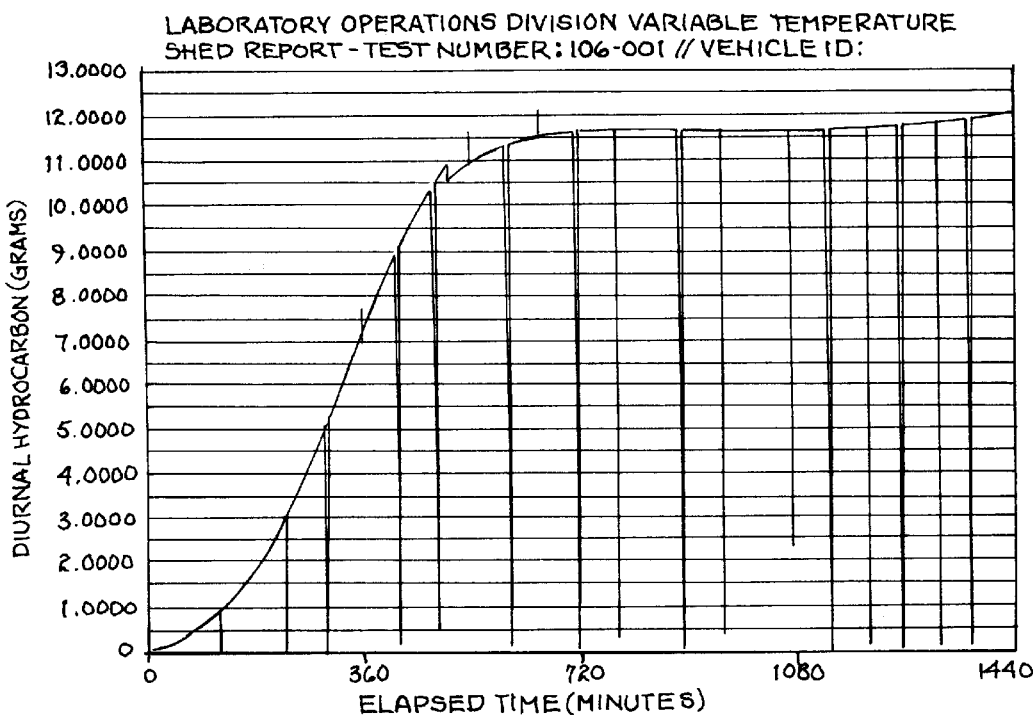
FIG. 6 is a graph illustrating the results from preliminary baseline testing of fuel vapor emissions from a tank without the bladder over a 24-hour diurnal temperature cycle.

In the baseline configuration, the tank included a vent in the filler cap. When tested with the vent open, the fuel tank emitted about 12.0 grams of hydrocarbons over the course of the test (EPA test number 106–001) as shown in FIG. 6. Most of these emissions occurred while the fuel temperature was increasing (i.e. diurnal breathing emissions). However, about one-half of a gram of hydrocarbon was during the second half of the test, while the fuel temperature was decreasing. These emissions were possibly the result of permeation. Permeation occurs as some gasoline molecules soak through the plastic tank material. Over the course of the entire test this would represent approximately one gram of hydrocarbon.

The fuel was modified by removing the fuel level gauge and resealing the fuel level gouge opening with a standard automotive-type fuel cap that included a 2.2 psi pressure relief valve and a vacuum relief valve. The fuel siphon pickup was modified to accept a pressure transducer (to monitor tank pressure) and was resealed with the cap. The bladder was constructed from two flat parallel sheets of Tedlar®. The Tedlar® sheets were sealed together along the edges to make the bladder with a volume of approximately 1.5 gallons. A plastic fitting was sealed into one of the planar surfaces of the bladder to serve as the bladder vent. The bladder was inserted into the fuel tank through the fuel inlet opening, and the original fuel inlet filler cap was modified to seal around the plastic fitting to substantially ensure a tight seal.

Figure 7:
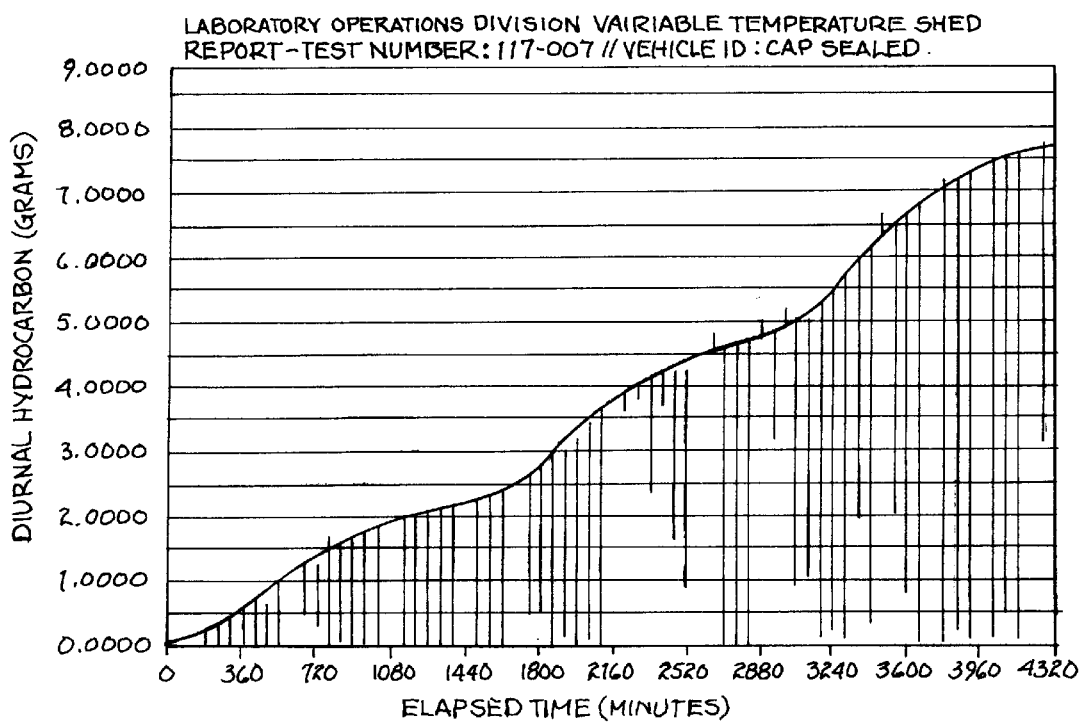
FIG. 7 is a graph illustrating a reduction of fuel vapor emissions over three consecutive 24-hour diurnal temperature cycles from a tank with the bladder.

The emissions from the modified fuel tank with the bladder were measured over three consecutive 24-hour diurnal temperature cycles according to the schedule above. The results were between about 2.2 and 3.0 grams of hydrocarbons per day over the three days of testing (EPA test number 117–007) as shown in FIG. 7. This reflects a reduction in emissions of at least 75 percent compared to the baseline configuration. Analysis of the attached hydrocarbon traces showed evidence of permeation emissions and some bypass of the seals (i.e., the seal around the plastic fitting, the seal around the pressure transducer, or the seal around the automotive-type fuel cap). Permeation emissions appear to be on the order of one gram per test. Thus, if the results were corrected for permeation, the system may have reduced emissions by up to 90 percent.

Pressure measurements indicated that tank pressure did increase slightly when the bag was fully deflated, but never reached the 2.2 psi required to open the pressure relief valve. The maximum tank pressure was approximately 0.7 psi. Similar EPA testing of other fuel tanks (not associated with this invention) has shown that without a bladder system, the tank pressure would reach 2.2 psi within five hours and the pressure relief valve would vent approximately 0.7 grams per test day for each gallon of the fuel capacity. For the six-gallon fuel tank used to demonstrate this invention, this would have been over four grams of hydrocarbons per day plus permeation. Thus, this invention achieved greater emission reductions with lower pressures than would have been achieved with a pressurized tank without the bladder.

In an alternative embodiment, the fuel tank ventilation system may be used in combination with a conventional charcoal canister evaporative control system, with the bladder and pressure relief valve being vented through the canister, rather than to the atmosphere. Fuel vapors adsorb to the charcoal. This may allow the use of more permeable bladder materials that may be less expensive, or may have better mechanical properties. It may further permit using a smaller bladder that may decrease costs. The advantage of this combined system over a conventional charcoal canister system is that a smaller canister may be used in the combined system than would be used alone.

From the foregoing, it is to be appreciated that the system and method substantially prevent fuel vapor emissions from a fuel tank thus improving air quality and the health of many affected by air pollution.

Although particular embodiments of the invention have been described in detail for purposes of illustration, various modifications may be made without departing from the spirit and scope of the invention. Accordingly, the invention is not to be limited, except as by the appended claims.

What is claimed is:

1. The method for substantially preventing fuel emissions comprising the steps of:

Providing a tank containing volatile fuel and wherein said volatile fuel has a vapor pressure;

Positioning a flexible bladder within the tank above the fuel and containing air under a second pressure; and connecting a vent to said flexible bladder and through which air may alternately be received into and emitted outside of said flexible bladder;

in response to an increase in said vapor pressure above said second pressure, emitting at least a portion of said air located in an interior of said flexible bladder outside of said flexible bladder through said vent until said vapor pressure and said second pressure equilibrate;

in response to a decrease in said vapor pressure bellow said second pressure, receiving air located outside of said flexible bladder to be received into said flexible bladder through said vent until said vapor pressure and said second pressure equilibrate.

2. The method of claim 1, wherein the volume of the flexible bladder is calculated by the equation $$\frac{V_B}{V} = 1 - \frac{(P_T - VP_{\max})}{(P_T - VP_{\min})}$$

wherein $VP_{min}$=vapor pressure of the organic liquid at the minimum temperature.

$VP_{max}$=vapor pressure of the organic liquid at the maximum temperature.

$P_T$=Total pressure (i.e., ambient pressure).

V=total volume of the tank (i.e., fuel capacity plus vapor headspace).

and $V_B$=required bladder volume.

3. A ventilation system for a sealed tank, comprising:

a sealed tank for containing an organic liquid that emits vapors and wherein said liquid has a vapor pressure;

a flexible bladder located within the sealed tank and containing air under a second pressure;

a vent connected to said flexible bladder and through which air may alternately be received into and emitted outside of said flexible bladder;

wherein an increase in said valor pressure above said second pressure causes at least a portion of said air located in an interior of said flexible bladder to be emitted outside of said flexible bladder through said vent until said vapor pressure and said second pressure equilibrate;

wherein a decrease in said vapor pressure below said second pressure causes air located outside of said flexible bladder to be received into said flexible bladder through said vent until said valor pressure and said second pressure equilibrate.

4. The ventilation system of claim 3, wherein the bladder inflates and deflates in response to changes in volume of the organic liquid.

5. The ventilation system of claim 3, further comprising a pressure relief valve for relieving excessive pressure within the sealed tank.

6. The ventilation system of claim 5, wherein the pressure relief valve expels the air to a charcoal canister evaporative control system.

7. The ventilation system of claim 3, further comprising a vacuum relief valve for relieving excessive vacuum within the sealed tank.

8. The ventilation system of claim 3, wherein the bladder includes at least one flotation device.

9. The ventilation system of claim 3, wherein the size of the bladder is calculated by the equation $$\frac{V_B}{V} = 1 - \frac{(P_T - VP_{\max})}{(P_T - VP_{\min})}$$

wherein $VP_{min}$=vapor pressure of the organic liquid at the minimum $VP_{max}$=vapor pressure of the organic liquid at the maximum temperature.

$P_T$=Total pressure (i.e., ambient pressure).

V=total volume of the tank (i.e., fuel capacity plus vapor headspace).

and $V_B$=required bladder volume.

10. The ventilation system of claim 3, wherein the organic liquid includes volatile fuels.

11. The ventilation system of claim 3, wherein the volatile fuels include gasoline.

12. The ventilation system of claim 3, wherein the bladder expels the air to a charcoal canister evaporative control system.

* * * * *